United States Patent
Calkins et al.

(10) Patent No.: US 6,648,562 B1
(45) Date of Patent: Nov. 18, 2003

(54) APPARATUS FOR TAPPING A HOLE IN A PIPELINE

(76) Inventors: Charles D. Calkins, 7319 S. 99th E. Ave., No. 1504, Tulsa, OK (US) 74133; Jerry L. Dunn, Rt. 2, Box 64D, Sperry, OK (US) 74023; David W. Albertson, Jr., 2415 S. 117th E. Ave., Tulsa, OK (US) 74129; Richard L. Goswick, 9634 E. 26th Pl., Tulsa, OK (US) 74129; Matthew W. James, 7326 E. 56th St., Tulsa, OK (US) 74135

( * ) Notice: Subject to any disclaimer, the term of this patent is extended or adjusted under 35 U.S.C. 154(b) by 250 days.

(21) Appl. No.: 09/877,318

(22) Filed: Jun. 8, 2001

(51) Int. Cl.[7] .................... B23B 41/08; B23B 51/04
(52) U.S. Cl. ...................... 408/67; 408/11; 408/13; 408/101; 408/137; 137/318
(58) Field of Search .................... 408/67, 101, 137, 408/8, 11, 16, 130, 10, 12, 13; 137/15.12–15.14, 317, 318

(56) References Cited

U.S. PATENT DOCUMENTS

| | | | | |
|---|---|---|---|---|
| 2,679,173 A | * | 5/1954 | Hill | 408/101 |
| 2,800,812 A | * | 7/1957 | Mueller et al. | 408/67 |
| 3,132,622 A | * | 5/1964 | Hackenberger | 91/509 |
| 3,508,410 A | | 4/1970 | Lynch | 61/69 |
| 3,578,233 A | | 5/1971 | Meister et al. | 228/5 |
| RE27,745 E | | 8/1973 | Brooks et al. | 166/0.5 |
| 3,851,492 A | | 12/1974 | Cannon et al. | 61/69 R |
| 4,063,619 A | * | 12/1977 | Drews | 187/274 |
| 4,076,130 A | | 2/1978 | Sumner | 214/1 PA |
| 4,091,514 A | | 5/1978 | Motes-Conners et al. | 29/33 T |
| 4,116,015 A | | 9/1978 | Duncan | 405/169 |
| 4,155,669 A | | 5/1979 | Rochelle | 405/158 |
| 4,223,925 A | | 9/1980 | Reneau et al. | 285/197 |
| 4,279,551 A | * | 7/1981 | Wilterding | 408/67 |
| 4,436,449 A | | 3/1984 | Smoot et al. | 405/170 |
| 4,441,328 A | | 4/1984 | Brister | 62/53 |
| 4,443,129 A | | 4/1984 | de Sivry et al. | 405/170 |
| 4,450,857 A | | 5/1984 | Baugh et al. | 137/318 |
| 4,535,822 A | | 8/1985 | Rogers, Jr. | 138/99 |
| 4,579,480 A | | 4/1986 | Szabo et al. | 405/169 |

(List continued on next page.)

*Primary Examiner*—Steven C. Bishop
(74) *Attorney, Agent, or Firm*—Gable & Gotwals; Paul H. Johnson (57) ABSTRACT

Apparatus for tapping a hole in a pipeline adapted to be attached to a support assembly having sealed communication with the exterior of a pipeline and having a tapping machine body with a boring bar rotatably supported therein with a circular cutter at the lower end thereof, a feed screw rotatably supported by the tapping machine body for axially positioning the boring bar, a hydraulically powered boring bar drive assembly within the tapping machine body driving the boring bar, a hydraulically powered feed screw drive assembly within the tapping machine body driving the feed screw and an auxiliary drive shaft affixed to rotate the feed screw drive assembly extending exteriorly of the tapping machine body and adapted to receive supplementary mechanical rotary energy for rotation of the feed screw so the boring bar can be retracted if hydraulic power is lost. A pressure compensation system permits the apparatus to be operated in a subsea environment. A position indicating system permits the location of the boring bar to be read out at a remote location, such as on the ocean's surface and an improved coupon retainer is provided.

19 Claims, 6 Drawing Sheets

U.S. PATENT DOCUMENTS

| | | | | |
|---|---|---|---|---|
| 4,579,484 A | * | 4/1986 | Sullivan | 408/56 |
| 4,654,590 A | * | 3/1987 | Kitaura et al. | 324/208 |
| 4,720,213 A | | 1/1988 | Gernhardt et al. | 405/190 |
| 4,784,525 A | | 11/1988 | Francois | 405/191 |
| 4,832,530 A | | 5/1989 | Andersen et al. | 405/170 |
| 4,878,694 A | | 11/1989 | Castel | 285/24 |
| 4,880,335 A | | 11/1989 | Lee | 405/158 |
| 5,002,441 A | * | 3/1991 | Dierich et al. | 408/10 |
| 5,074,713 A | | 12/1991 | Reis | 405/169 |
| 5,439,331 A | * | 8/1995 | Andrew et al. | 408/8 |
| 5,593,249 A | | 1/1997 | Cox et al. | 405/191 |
| 5,642,965 A | | 7/1997 | Dos Reis et al. | 405/191 |
| 5,755,537 A | * | 5/1998 | Lubbering | 408/10 |
| 6,012,878 A | * | 1/2000 | Hicks | 137/318 |

* cited by examiner

APPARATUS FOR TAPPING A HOLE IN A PIPELINE

REFERENCE TO PENDING APPLICATIONS

This application is not related to any pending United States or international patent application.

REFERENCE TO MICROFICHE APPENDIX

This application is not referenced in any Microfiche Appendix.

BACKGROUND OF THE INVENTION

The invention to which this disclosure pertains is an apparatus for tapping a hole in a pipeline and it is particularly adapted for use as a subsea tapping machine. The invention is specifically applicable for use in diverless subsea tapping operations.

Tapping machines have been used for drilling holes in the sidewall of pipelines in which the pipeline is under liquid or gas pressure since at least 1971 when U.S. Pat. No. 3,614,252 entitled, "Tapping Apparatus" was granted. This patent discloses a tapping apparatus that includes a supporting assembly affixed to the exterior of a pipeline, a feed screw mounted on the supporting assembly for rotation around its longitudinal axis, a boring bar connected to the feed screw for axial movement relative to the boring bar upon relative rotation of the feed screw and bar, a cutter connected to the boring bar for rotation by the boring bar and for rotatably engaging the external surface of a pipeline by which a hole is cut into the pipeline. The relative rotational speed of the boring bar and feed screw are employed to control the axial advancement or retraction of the boring bar and, correspondingly, the hole cutter. This patent further describes a system for controlling the relative speed of rotation of the boring bar and adjust the rate the feed screw moves the boring bar and the cutter in proportion to the load applied to the cutter.

The tapping apparatus disclosed in U.S. Pat. No. 3,614,252 is designed for use on the earth's surface—that is, was not specifically designed for use underwater. However, U.S. Pat. No. 4,579,484 entitled, "Underwater Tapping Machine" that issued on Apr. 1, 1986 provides a machine that is specifically useful in tapping a hole in a pipeline in which the pipeline is submerged in water. This patent describes changes in the tapping machine of U.S. Pat. No. 3,614,252 that are required to accommodate the pressure applied by a water environment such as when tapping a hole in a pipeline in a lake, in the bottom of a river or in an ocean. Specifically, U.S. Pat. No. 4,579,484 describes how pressures are balanced between the exterior and the interior of a tapping machine in an underwater environment.

A substantial force can be imposed on a tapping apparatus when the circular drill penetrates the wall of the pipeline under pressure—that is, when the pressure within the pipeline is applied to the interior of the tapping machine. Tapping a pipeline under pressure is frequently referred to as "hot tapping". To alleviate these high forces U.S. Pat. No. 5,439,331 that issued on Aug. 8, 1995 entitled, "High Pressure Tapping Apparatus" provides a means to control the hydraulic fluid pressure inside the tapping machine body based upon the pipeline pressure so that the pressure inside the pipeline body can be increased or decreased as required to at least substantially counterbalance the pressure encountered when the wall of a high pressure pipeline is penetrated.

U.S. Pat. No. 6,012,878 entitled, "Pressure Balanced Subsea Tapping Machine" that issued on Jan. 11, 2000 provides further refinements in the technology of counterbalancing internal and external pressures encountered by a tapping machine when tapping a high pressure subsea pipeline. That is, this patent teaches techniques to counterbalance not only the great ambient pressures encountered in tapping a subsea pipeline but also provides for counterbalancing the high pressures encountered internally when the pipeline wall is penetrated.

These four mentioned previously issued U.S. Patents— that is, U.S. Pat. Nos. 3,614,252, 4,579,484, 5,439,311 and 6,012,858 are all specifically related to pipeline tapping machines and the later issued ones to pipeline tapping machines used underwater. These four patents form a good background for the improvements contained in the present disclosure. These four patents including the drawings and descriptions therein are incorporated herein by reference as if repeated verbatim and as if the drawings were part of the drawings of the present disclosure in this application.

For additional information relating to subsea tapping operations and to the general area of maintaining, repairing and tapping onto submerged pipelines, reference may be had to the following previously issued United States patents:

| PATENT NO. | INVENTOR | TITLE |
| --- | --- | --- |
| RE 27,745 | Brooks et al. | Subsea Production System |
| 3,508,410 | Lynch | Submerged Pipeline Repair System |
| 3,578,233 | Meister et al. | Apparatus for Remotely Joining Underwater Pipelines |
| 3,599,663 | Ver Nooy | Hot Tapping Apparatus |
| 3,614,252 | Rose et al. | Tapping Apparatus |
| 3,851,492 | Cannon et al. | Apparatus and Method for Offshore Operations |
| 4,076,130 | Sumner | Apparatus for Mounting a Coupling Member Over a Pipe End in a Subsea Location |
| 4,091,514 | Motes-Conners | Subsea Machine Tool |
| 4,116,015 | Duncan | Method and Apparatus for Remotely Attaching a Riser Pipe to an Offshore Structure |
| 4,155,669 | Rochelle | Deep Water Repair Methods and Apparatus |
| 4,223,925 | Reneau et al. | Hot Tap Machine |
| 4,436,449 | Smoot et al. | Drill Ship Pipe Capture |
| 4,441,328 | Brister | Method and Apparatus for Forming a Temporary Plug in a Submarine Conduit |
| 4,443,129 | de Sivry et al. | Method and Apparatus for Tapping a Submerged Pipe |
| 4,450,857 | Baugh et al. | Device for Tapping and Plugging a Fluid Conductor |
| 4,535,822 | Rogers, Jr. | Fitting Installation Device |
| 4,579,480 | Szabo et al. | Remotely Controllable Handling Device for Submerged Structures, particularly for Connecting Underwater Pipes |
| 4,579,484 | Sullivan | Underwater Tapping Machine |
| 4,720,213 | Gernhardt et al. | Apparatus for Inspecting, Cleaning and/or Performing Other Tasks in Connection with a Welded Joint |
| 4,784,525 | Francois | Apparatus for Use in Installing a Piece of Equipment Horizontally on a Submerged Unit and for Removing It Therefrom |
| 4,832,530 | Andersen et al. | Apparatus and Method for Joining Pipe Sections Underwater |
| 4,878,694 | Castel | Method and Device for the Remote Positioning of an Elbow Coupling |

-continued

| PATENT NO. | INVENTOR | TITLE |
|---|---|---|
| 4,880,335 | Lee | Method and Apparatus for Removing Concrete Coating from Pipe |
| 5,074,713 | Reis | Connector Module to Deal with, Extend and Repair Undersea Lines, Operated by Remotely Operated Vehicle |
| 5,439,331 | Andrew et al. | High Pressure Tapping Apparatus |
| 5,593,249 | Cox et al. | Diverless Flowline Connection System |
| 5,642,965 | Dos Reis et al. | Interface System for Operation of Remote Control Vehicle |
| 6,012,878 | Hicks | Pressure Balanced Subsea Tapping Machine |

Because of the almost insatiable demand for petroleum in the world today, more and more production occurs offshore—that is, in the ocean. As exploration and production moves to deeper water, transporting newly found gas and oil economically becomes a key factor in determining the profitability of deep water exploration. Underwater pipelines have been installed in older fields. When new production is found in adjacent oil fields, substantial savings can be obtained by routing production to existing lines but only if the existing lines can be tapped and especially, only if the existing lines can be tapped while under pressure—that is, without interfering with current production.

When underground pipelines exist at relatively shallow depths, underwater tapping operations can be very successfully carried out by the use of divers. However, as working depths increase, the use of divers becomes more and more impractical. Therefore, a need has developed for subsea tapping machines that can be operated without the benefit of a diver. The invention of the present disclosure is particularly related to a subsea tapping machine that is specifically adaptable for diverless operation. This is not to mean that the principles of the present invention are limited to diverless subsea tapping machines as such principles may be employed even if a diver is present or some of the principles of the invention disclosed herein may be applicable for designing and developing improved tapping machines for use on-shore, however by and large, the present invention is particularly adaptable for diverless subsea tapping machine operations.

Hot tapping is a well proven and established technology whereby a new smaller or equal size pipeline can be joined into an existing pipeline while the existing pipeline is on-line and operating at full pressure and temperature. Hot taps are completed by installing a mechanical clamp fitted with elastomeric seals around the pipeline. A branch outlet on the mechanical clamp is fitted with a block valve to form a control outlet. The mechanical clamp seals around the pipeline and the block valve isolates the pressure once a hole is cut in the pipeline. A tapping machine is attached to the block valve. The block valve is opened to allow the tapping machine cutter to contact the pipeline and to cut a hole in it. After cutting a hole in the pipeline, the cutter is withdrawn through the valve and the valve is blocked in. The branch is then ready for a tie-in.

Subsea mechanical hot tap clamps typically use elastomeric elements to form a seal around a pipeline. The hot tap clamp is a split sleeve-type clamp that forms an annulus around the pipeline. The sealing system typically utilizes circumferential packers and longitudinal seals to form a pressure boundary around a pipeline. A structural branch connection is either welded or machined into one clamp half as fitted to provide a tie-in point. The branch connection is fitted with a block valve which functions as a pressure boundary control point to the trunk line.

The tapping machine is attached by use of a flange to the block valve. The typical subsea hot tapping machine is a hydraulic mechanical machine operated by a diver. Once a hole is cut, the cutter head is retracted back through the valve, the valve is shut in, and the hot tapping machine is removed.

The basic steps required for a typical subsea hot tap of a pipeline are as follows;
 a) locate the pipeline;
 b) excavate around the pipeline where the hot tap is to occur;
 c) initial inspection of pipeline for field joints and longitudinal weld seams;
 d) clean the pipeline of coatings to bare metal;
 e) measure the pipeline for tolerances acceptable for hot tap clamp installation;
 f) rig and deploy a hot tap clamp;
 g) conduct pressure tests to verify that no leaks exist between the hot tap clamp and the exterior of the pipeline;
 h) affix a valve, typically a ball valve, to the hot tap clamp;
 i) affix a hot tap machine to the valve;
 j) tap the pipeline;
 k) withdraw the tapping machine boring bar and close the valve;
 l) remove the tapping machine from the valve;
 m) affix a branch connection to the valve; and
 n) open the valve to provide communication between the interior of the pipeline and the interior of the branch connection.

As can be seen from the summary procedure above, subsea hot tapping requires substantial bottom time by divers. Diver intervention is not feasible in water depths in excess of about 1,000 feet. Below about 1,000 feet of water, a remote operating vehicle—that is, an underwater robotic device controllable from the earth's surface is the most feasible way of performing hot tapping operations.

In the Gulf of Mexico, approximately 60% of all new pipelines scheduled for installation in the next three years are in water depths greater than 2,000 feet. Tying into closer existing pipelines could reduce the cost of installing many of these pipelines. In some locations, provisions have been made to allow for a tie-in by means of a lateral Tie-In Sled or Pipeline End Manifold. In many locations however, this equipment is not available and the only option is to complete a hot tap tie-in.

BRIEF SUMMARY OF THE INVENTION

The apparatus for tapping a hole in a pipeline of this disclosure is characterized by one or more of the following improvements in existing tapping machine technology:
 a) A centrally located flange for adapting the tapping machine to different pipeline sizes and that allows for use of different length spool pieces and accommodates varying lengths/diameters of tapping valves and collet connectors while minimizing travel requirements for the tapping machine.
 b) A linear position indicator extending down the center of the tapping machine to provide an electronic signal that indicates the boring bar position.

c) Rotational speed transducers providing feed screw and boring bar revolutions per minute data from which feed rate and the position of the boring bar can be calculated. These transducers sense rotation from magnet wheels located behind the feed and drive motors and provide a reliable means for determining feed and drive rotational speed for use in calculating and setting tapping parameters.

d) A pilot drill with spring loaded positive retention latches to capture coupons and for providing a redundant and positive coupon retention method which still allows the tapping machine to be removed even if the tap is partway complete—that is, the coupon is not completely cut from the pipeline.

e) A circular cutter with hard-faced teeth rather than the typically brazed or mechanically attached teeth used with existing tapping machines to provide a system for cutting higher than normal strength pipeline efficiently while minimizing the possibility of a loose tooth causing excessive cutter damage or failure to complete a tap.

f) A remote mechanical feed screw override that can be connected with a remote operating vehicle to allow emergency retraction of the boring bar and removal of the tapping machine or completion of a tap in the case of partial or total hydraulic failure.

g) A boring bar accumulator that equalizes the tapping machine internal pressure to seawater pressure initially and then equalizes tapping machine internal pressure to pipeline pressure after the pilot drill penetrates the pipeline to thereby prevent applying a pressure load from the pipeline to the tapping machine drive threads.

h) A relief valve to relieve pressure as the boring bar is retracted in the event the piston in the boring accumulator becomes stuck or pressure builds up because of a leak to thereby insure that the boring bar can be retracted and the tapping machine recovered in the event of a failure in the pressure balancing system.

i) A motor housing accumulator to equalize pressure to the subsea pressure to keep from damaging the hydraulic motors from high external pressure in deep water and further to insure a redundant and more reliable pressure balancing and over-pressure protection for deep water applications by protecting the hydraulic motors and other components of the tapping machine.

j) A check valve to allow seawater into the motor housing in the event of a seal leak that permits motor housing pressure to fall below the sea pressure to insure a redundant and therefore more reliable pressure balancing and over-pressure protection system for protecting the hydraulic motors and components in the tapping machine in the event of a balancing system failure.

k) A relief valve to relieve pressure in the motor housing in the event of a seal leak that permits the motor housing pressure to rise above the sea pressure to ensure redundant and therefore more reliable pressure balancing and over-pressure protection for protecting the hydraulic motors and components in the tapping machine in the event of balancing system failure.

l) A hydraulic counterbalance valve to limit feed motor overrunning to ensure adequate independent control of the feed and drive speeds while using a single hydraulic power source. Frictional forces generated by the seals in the drive tube when subjected to high pressures tend to rotate the feed motor when the drive motor is turning. The counterbalance valve is a normally open valve that is closed when pressure on the downstream side of the feed motor is high compared with the feed motor upstream pressure. Overrunning is the tendency of one motor to rotate because of rotation of another motor.

m) A digital remote control system including read-outs of pressures at the drive motor, the feed motor and the motor housing and at both sides of the boring bar accumulator. The feed motor and drive motor rotational speeds are monitored using rotational speed sensor outputs. The boring bar position is monitored directly by reading the linear transducer output and indirectly by calculating the boring bar position using the rotational speed transducer outputs and the known relationship between the motor speed and feed rate. The boring bar accumulator piston position is also monitored to check for malfunctions in the compensation system to thereby effectively control tapping machine functions while providing operating condition information to the operator sufficient to properly complete a tap from a very remote location and to diagnose and resolve problems.

The tapping machine of this disclosure is designed to operate at underwater depths previously unachievable when the use of a diver was mandated. The tapping machine of this disclosure is able to operate at a maximum depth of 10,000 feet of seawater, well beyond the current limits of human divers. The machine is remotely operated from the surface. Taps may range in size from 6 inches to 20 inches or larger and work with a maximum pipeline operating pressure of 3705 psi whether operating on land or at depth of up to 10,000 feet of seawater.

The tapping machine is mounted into a support and alignment frame to prepare it for subsea use. The mating half of the collet connector is attached to the tapping machine while it is in the frame. The frame is lowered until the opposed halves of the collet connector mate. Seawater is purged from the fitting. A subsea power unit/tool control module mates with the machine and provides the hydraulic power and the electronic communication circuits required to operate and monitor the tapping machine. A technician operates and monitors the tapping machine from the surface using remote control technology. To assist the technician, the machine itself is designed to prevent cutter stalls through a self-adjusting load sensing circuit to relieve the cutter feed rate during difficult tapping operations. A self-activating pilot ensures positive coupon retention during tapping operations. Upon completion of a tap, the cutter is retracted and the tapping machine is retrieved to the surface.

The tapping machine herein employs a number of systems to ensure reliable operation and to provide feedback to the technician. These include:

a) a linear transducer used to monitor the exact boring bar position during a tap;

b) sensors to monitor the rotation of the boring bar and feed screw and for use in calculating boring bar position as a redundant system to the linear transducer;

c) a pressure balancing accumulator to balance the pressure across the boring bar to relieve stress on the feed and drive systems during the tapping operation;

d) a motor housing balancing system having an accumulator used to balance the pressure in the motor housing with the sea pressure to ensure reliable motor operation;

e) check and relief valves to ensure that the pressure in the motor housing and the pressure balancing circuits remain within acceptable limits;

f) accumulator pressure/position sensors to ensure proper operation of the balancing accumulators and monitor the volume displacement in the accumulators;

g) hydraulic system pressure monitors to indicate the loading on the system; and h) a counterbalance valve for preventing overrunning of the feed motor by the drive motor.

A better understanding of the invention will be obtained from the following detailed description of the preferred embodiment and the claims, taken in conjunction with the attached drawings.

DETAILED DESCRIPTION OF A PREFERRED EMBODIMENT

Tapping machines or the type to which this invention relates have been well known and used for many years particularly in the petroleum industry and for background information relating to tapping machines, reference should be had to U.S. Pat. Nos. 3,614,252; 4,579,484; 5,439,331; and 6,012,878. These four references show various aspects of the basic tapping machines useful for providing a hole in the sidewall of a pipeline while the pipeline is under pressure, such as a pipeline through which liquid or gas hydrocarbon products flow. Obviously the pipeline tapping machine of this type can be used in industries other than the petroleum industry such as in the chemical industry or any other application where a cylindrical vessel needs to be provided with a sidewall communication.

Figure 2:
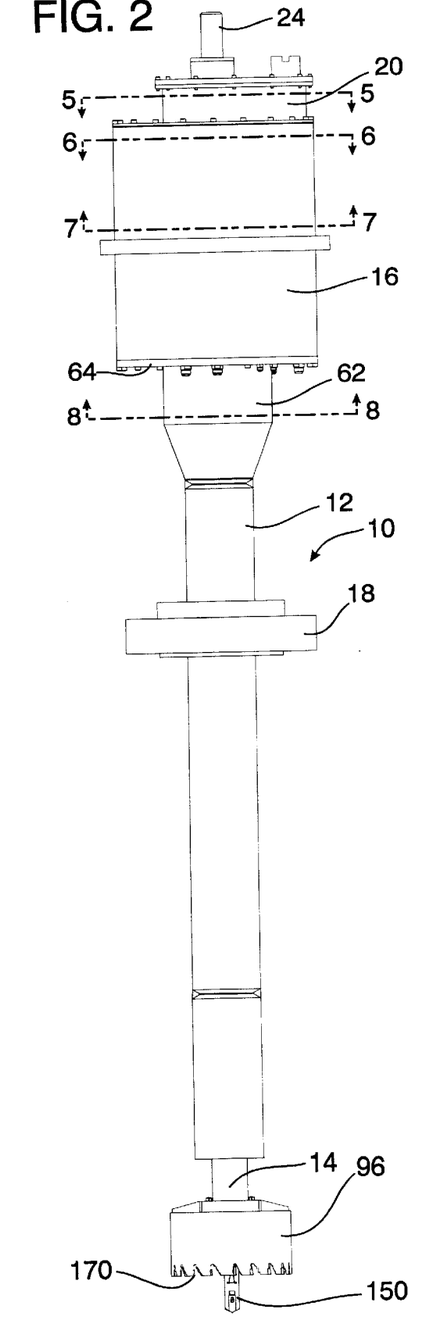
FIG. 2 is an elevational view of the tapping machine of FIG. 1.

FIG. 2 is an elevational exterior view of a tapping apparatus or tapping machine that embodies that principles of this invention, the tapping apparatus being generally indicated by the numeral 10. Seen in this exterior view, the tapping machine includes a tubular housing 12 that has extending from the lower end thereof a boring bar 14. At the upper end of tubular housing 12 is a motor housing 16. Formed on tubular housing 12 is a flange 18 that is used for mounting the tapping machine to a system by which it is supported in relation to a pipeline.

Extending from the top of motor housing 16 is a feed screw auxiliary drive case 20. Extending upwardly out of auxiliary drive case 20 is a coupling adapter 22 that is used if auxiliary power must be applied to retract the boring bar. Also extending upwardly from auxiliary drive case 20 is a connector 24 by which connection can be made to receive signals indicating the position of the boring bar within the tapping machine. All of these elements which are identified in the external view of FIG. 2 will be discussed in greater detail subsequently.

Figure 4:
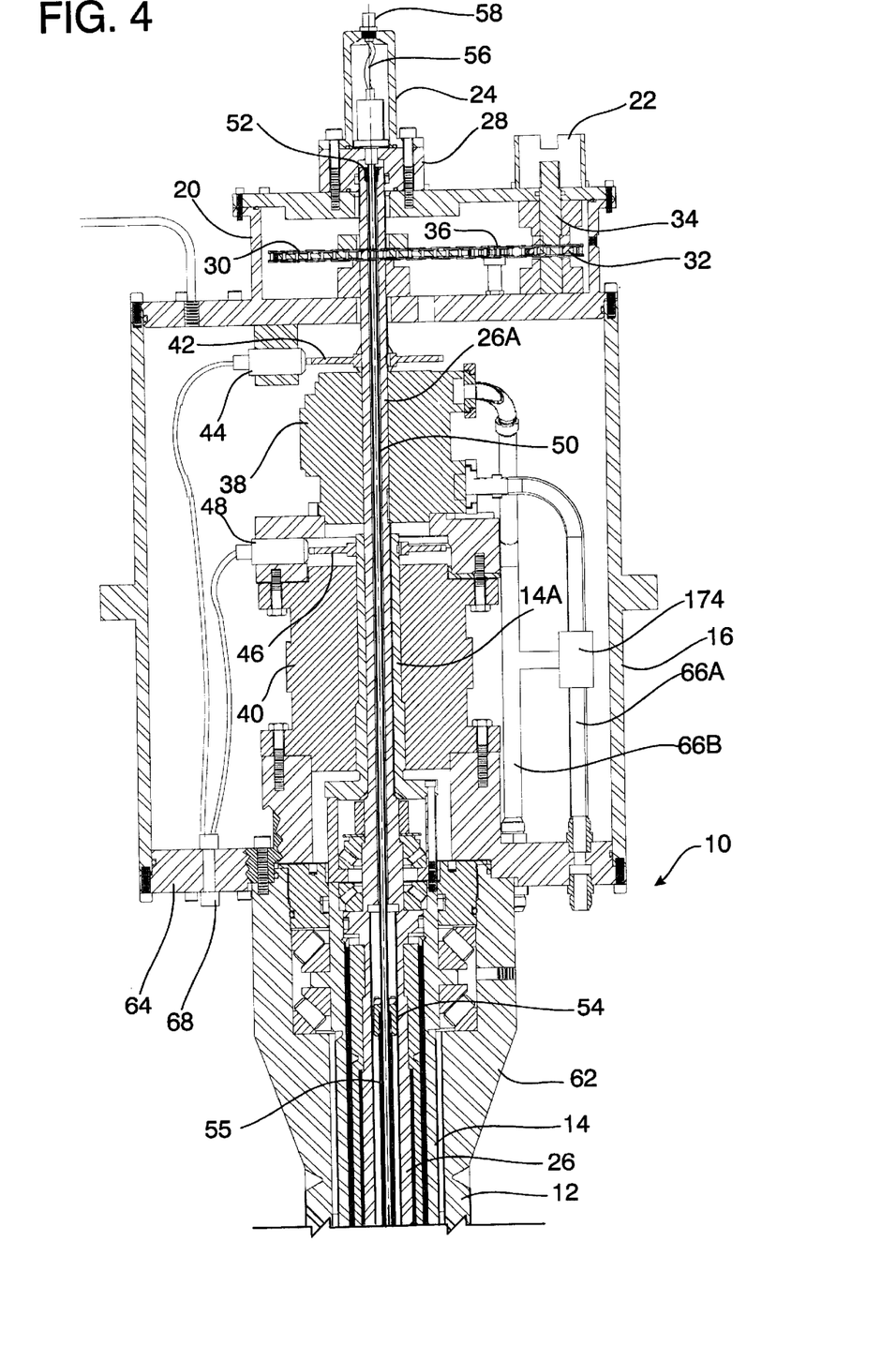
FIG. 4 is an enlarged cross-sectional view of the upper portion of the tapping machine of FIG. 1.

FIG. 4 is an enlarged cross-sectional view showing more details of the construction and operation of the upper portion of the tapping machine to which reference will now be made. Rotatably received within tubular housing 12 is an upper portion of boring bar 14 and connected at the upper end of boring bar 14 is an upper boring bar extension 14A. A feed screw 26 is rotatably received in a threaded arrangement, within boring bar 14. The feed screw includes on upper extension portion 26A.

Affixed to the upper end of auxiliary drive case 20 is a bearing block 28 that rotatably receives the upper end of the feed screw extension 26A. Within auxiliary drive case 20 there is a feed screw driven gear 30. In the plane of feed screw driven gear 30 and within auxiliary drive case 20 is a feed screw drive gear 32 supported and rotated by a feed screw auxiliary drive shaft 34, the upper end of which terminates within coupling adapter 22. A chain 36 interconnects feed screw drive gear 32 with feed screw driven gear 30. Thus, when feed screw auxiliary drive shaft 34 is rotated, the feed screw itself is rotated. In the normal operation of the tapping apparatus, feed screw auxiliary drive shaft 34 is not employed but is available for emergency use in a manner that will be described subsequently.

Positioned within motor housing 16 is a hydraulic feed screw drive motor 38 and below it, a boring bar drive motor 40. Drive motors 38 and 40 are operated in response to hydraulic fluid flow that is controlled in a way to be described.

Supported on feed screw drive shaft extension 26A is a magnet wheel 42 and positioned adjacent the periphery of the magnet wheel is a sensor 44. Magnet wheel 42 has a periphery defined by spaced apart teeth that individually activate sensor 44 to provide an electric signal with the passage of each tooth. Sensor 44 is typically a Hall Effect sensor and the electrical signal emanating from sensor 44 provides a count of the rotation of feed screw extension 26 and detects not only the angular rotation but also the direction of rotation of the feed screw. In like manner, there is a magnet wheel 46 affixed to an extension 14A of boring bar 14. Positioned adjacent the peripheral edge of boring bar magnet wheel 46 is a sensor 48 that, like sensor 44, is preferably a Hall Effect sensor. Signals from sensor 48 reveal the rotation (both clockwise and counterclockwise) of the boring bar. In addition to use of magnet wheels, optical encoders may be used to provide information as to the rotation of the boring bar and the feed screw.

As is well described in U.S. Pat. No. 5,439,331, the relative rotation of boring bar 14 and feed screw 26 determines the axial extension or retraction of the boring bar to advance or retract a cutter (as will be described subsequently) in the process of boring a hole in a pipe and withdrawing the cutter upon completion of the drilling operation. If the boring bar and the feed screw rotate in synchronization—that is, at the same rate and direction, there is no relative rotational movement between the two and the boring bar does not advance or retract. On the other hand, if the feed screw rotates slower than the boring bar then the boring bar is advanced downwardly in the direction towards a pipe to which the tapping machine is affixed and if the feed screw rotates faster than the boring bar then the boring bar is retracted. In the same way, if the boring bar is stationary—that is, not rotating then the rotation of the feed screw in one direction will retract the boring bar and rotation of the feed screw in the opposite direction will advance the boring bar. The concept of advancing and retracting the boring bar by means of a rotating feed screw is not new to the present invention, however, in the present invention it is critically important that remote operators of the system be constantly aware of the position of the boring bar. Therefore, the signals generated by magnet wheel sensors 44 and 48 can be employed in a computer to provide information to a remote operator of the longitudinal position of the boring bar, which is critical of the operation of the tapping apparatus.

Figure 1:
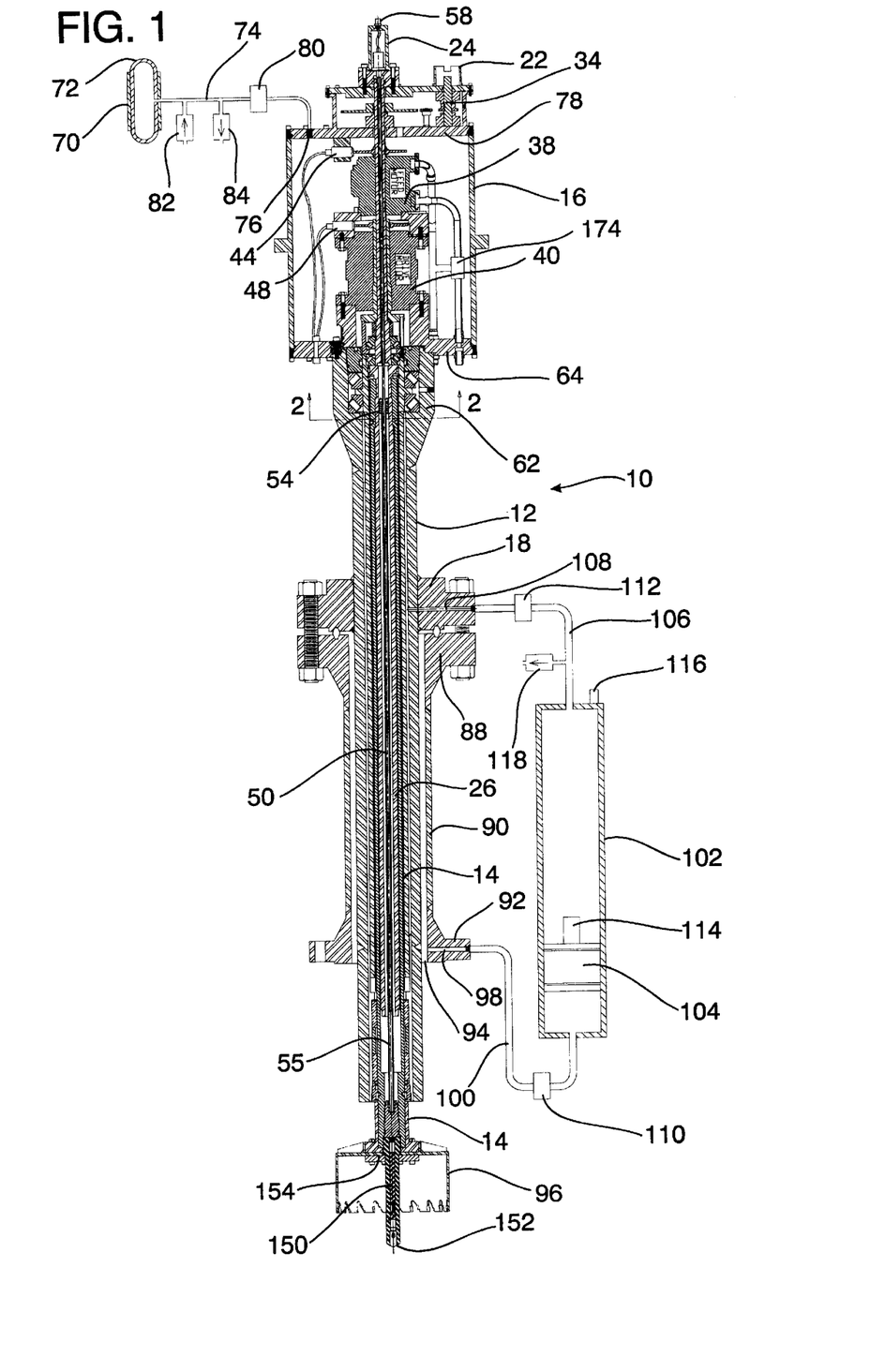
FIG. 1 is a cross-sectional view of a tapping machine that incorporates the principles of this invention.

The feed screw and boring bar are concentric with each other and each are tubular. Positioned within feed screw 26 is an elongated cylindrical linear transducer 50. The transducer is secured at its upper end portion 52 (as seen in the top portion of FIG. 4) so that the linear positioning transducer remains both rotationally and elevationally stationary with respect to the tapping apparatus. Positioned within the interior of feed screw 26 is a tubular magnet 54 secured to the upper end of a tubular positioning member 55. The lower end of tubular positioning member 55 is secured to lower internal end portion of boring bar 14 as seen in FIG. 1. In this way, magnet 54 moves with the longitudinal extension and retraction of the boring bar 14. The relative longitudinal location of magnet 54 provides an electrical signal at the upper end of the linear positioning transducer 50, the electrical signal appears on conductor 56 and the signal is available at an electrical coupling portion 58. Thus, there is provided an electrical signal at coupling 58 that gives information as to the linear position of boring bar 14 and therefore the linear position of a cutter attached to its lower end.

It can therefore be seen that the invention herein provides a redundant system for providing information to an operator as to the location of the tapping apparatus boring bar and consequently the cutter secured to the lower end thereof. Providing redundant information is important since the tapping apparatus is typically operated completely from a remote location—that is, the operator of the tapping apparatus will normally be located in a ship floating on the surface of a body of water, usually the surface of an ocean. Remote control of the tapping apparatus depends on information transmitted to the operator and one of the most critical pieces of information needed by the operator is the location of the boring bar and correspondingly the location of the cutter in the process of tapping into an underwater pipeline.

Figure 5:
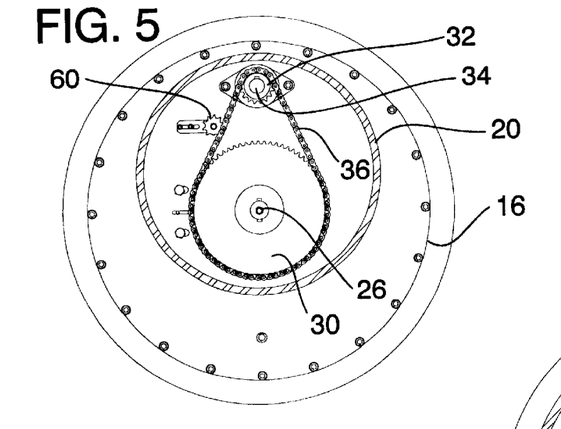
FIG. 5 is a horizontal cross-sectional view of the tapping machine taken along the line 5—5 of FIG. 2.

FIGS. 5, 6, 7 and 8 are cross-sectional views that help illustrate the basic components that make up the tapping apparatus. As an example, FIG. 5 is taken horizontally and looking downwardly on a plane passing through auxiliary drive case 20 to show the relationship between gears 30 and 32 as previously described. This view shows that an adjustable idler gear 60 that is employed to maintain proper tension in chain 36.

Figure 6:
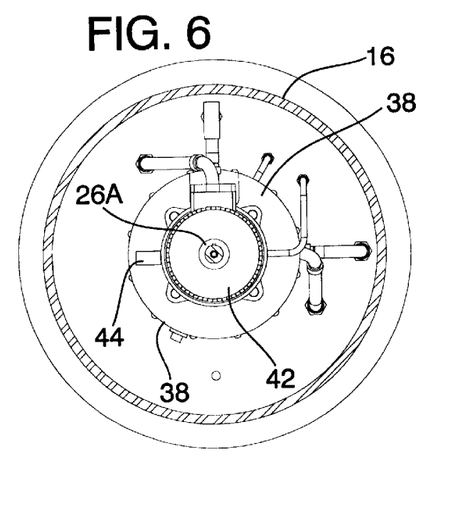
FIG. 6 is a horizontal cross-sectional view of the tapping machine taken along the lines 6—6 of FIG. 2.

FIG. 6 is a horizontal plane looking downwardly through a cross-section of the upper portion of motor housing 16 and shows magnet wheel 42 supported to feed screw extension 26A and sensor 44 that respond to the teeth on the peripheral surface of the magnet wheel to provide electrical signals by which the longitudinal position of the boring bar can be calculated. FIG. 6 shows hydraulic tubing as employed to provide hydraulic power to feed screw drive motor 38.

Figure 7:
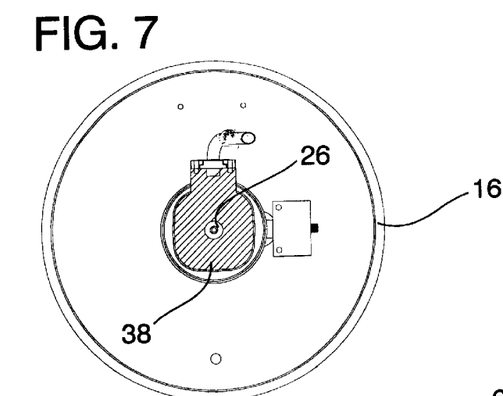
FIG. 7 is a horizontal cross-sectional view of the tapping machine taken along the line 7—7 of FIG. 2.
Figure 8:
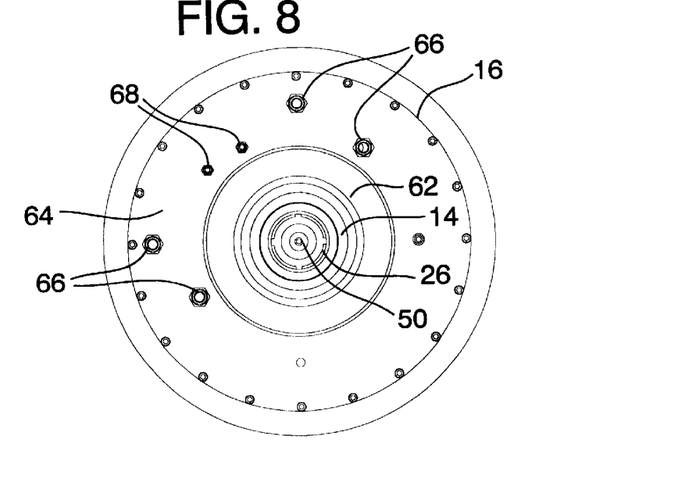
FIG. 8 is a horizontal cross-sectional view of the tapping machine taken along the line 8—8 of FIG. 2.

FIG. 7 is a horizontal cross-sectional view looking upwardly and shows the bottom of feed screw drive motor 38. FIG. 8 is a horizontal cross-sectional view taken through a collar portion 62 of the tubular housing. This shows an upward looking view of the motor housing bottom plate 64 and shows the concentric relationship between the boring bar 14, the feed screw 26 and the centrally positioned linear transducer 50. Further, FIG. 8 shows hydraulic tubing 66A and 66B extending from the bottom plate by which hydraulic energy is supplied for operation of feed screw drive motor 38. Similar hydraulic tubing extends to boring bar drive motor 40 but such tubing is not seen in the Figures. Further, sealed openings 68 are provided for passage of conductors extending from sensors contained with motor housing 16.

The tapping machine of this invention is specifically devised for use in subsea tapping applications and most particularly in subsea tapping applications that are too deep for use of a diver. Usually, a diver can operate in water no deeper than about 1,000 feet. Where tapping of pipelines is required in deeper water, the operation must be operated without a diver—that is, "diverless". The tapping machine of this disclosure, while not limited to such use is particularly adapted to serve as a "diverless subsea tapping machine". Therefore, the tapping machine 10 must be configured and arranged to operate in exceedingly high ambient water pressures. For this reason, it is important that the tapping machine be carefully pressure balanced so that high differential pressures do not build up within the tapping machine compared to the ambient environment in which it is used or with the internal pressure of a pipeline being tapped. Stating this another way, it is important that the tapping machine be carefully pressure balanced and the methods of accomplishing this are illustrated best with reference to FIG. 1.

First, it is important that the gear case be pressure balanced so that the differential pressure interior and exterior of the gear case never exceed the pressure capability of the gear case housing. The basic concept of pressure balancing a subsea tapping machine is fully and completely illustrated in U.S. Pat. No. 6,012,878 which has been incorporated herein by reference. The invention herein makes use of the teachings of this patent but adds additional features as will now be explained. As shown in U.S. Pat. No. 6,012,878, pressure balancing for subsea applications is accomplished by means of a system that includes a containment shell 70. Within the containment shell is an elastomeric bladder 72 having a tubular conduit 74 extending from it, the conduit extending through an opening 76 in a gear top plate 78. The interior of motor housing 16, elastomeric bladder 72 and conduit 74 are filled with hydraulic fluid.

As environmental pressures in which the tapping machine is positioned increase, elastomeric bladder 72 is compressed. This pressure of compression is fed into the interior of motor housing 16 so that the pressure within and without the motor housing remain essentially the same.

Secured to tubular conduit 74 is a pressure transducer 80 that provides an electrical signal that is passed to an operator positioned at the earth's surface, such as on a ship. This enables the operator to be constantly informed of the pressure within motor housing 16 so that if any malfunction of the pressure equalizing system occurs, the operator will be made aware of it. In communication with tubular conduit 74 is a first relief valve 82 that, if opened, permits seawater to flow into conduit 74 and thereby into the interior of motor housing 16. The function of relief valve 82 is to open only in the case of any emergency that could arise if hydraulic flow from elastomeric bladder 72 is blocked in some way so the pressure within the interior motor housing 16 is not equalized by hydraulic fluid flow between the elastomeric bladder and the interior of the motor housing. Obviously, it is highly deleterious to permit seawater to enter motor housing 16 therefore, relief valve 82 exists only in case of a malfunction to prevent the collapse of the motor housing 16.

In addition, there is a second relief valve 84 in communication with tubular conduit 74 that, in the case of emergency, will permit the flow of hydraulic fluid out through the valve when the pressure exceeds a predetermined limit. This predetermined limit is set at a value that is less than the pressure holding capacity of the motor housing 16 and functions to open only in an emergency to prevent the rupture of the gear case housing in the event some malfunction causes the pressure within the housing compared to the environmental pressure to increase to the point beyond which the housing can contain the differential pressure or the hydraulic motors can withstand external pressure. Therefore, it can be seen that first and second pressure relief valves 82 and 84 function only in the event of some malfunction to prevent the rupture of motor housing 16 either in the event of excessive pressure within the gear case or inadequate pressure within the motor housing to balance the differential pressure between the interior and the exterior of the motor housing and when pressure balance would result either in the explosion or the collapse of the motor housing or collapse of the motor seals. In the normal operation pressure relief valves 82 and 84 remain closed at all times.

The elastomeric bladder 72 is shown diagrammatically as being received in containment shell 70. The actual configuration of the pressure balanced system is better illustrated in U.S. Pat. No. 4,579,484. In FIG. 3 of that patent, a structural housing is shown having an elastomeric member that separates the ambient environment—that is, ocean water, from hydraulic fluid while permitting pressure between the fluid and the ambient ocean water to balance. Another type of pressure balance system is shown in FIG. 4 of that patent wherein a piston moving within a cylinder is utilized to separate ambient water from hydraulic fluid. Thus the pressure balance system exemplified by containment shell 70 and elastomeric bladder 72 are diagrammatic only and any known type of pressure equalizer systems can be employed to meet the requirements of these elements.

When the tapping apparatus of this invention is utilized to form an opening in a pipeline, the pipeline may frequently be in actual use—that is, liquids and/or gases flow through it and, in such circumstance, the pressure internally of the pipeline may be greater than the pressure of the surrounding ocean water. Upon penetration of a pipeline, there may be suddenly applied to the interior of the tapping machine a substantially increased pressure load. This pressure load is applied to the boring bar and the other pieces of apparatus within the tapping machine by which boring is completed. For this reason it is important that the pressure within the tapping apparatus tubular housing 12 be equalized with the pressure interior of the pipeline through which a hole is being drilled. The concept of equalizing pressure between a pipeline being tapped and the interior of a tapping machine is illustrated in U.S. Pat. No. 6,012,878. The system for accomplishing this in the present tapping machine is illustrated in FIG. 1. In FIG. 1, tubular housing flange 18 is shown affixed to an upper flange 88 that is a part of an elongated tubular spool 90. Spool 90 has a lower flange 92 by which the spool can be supported to a structure attached to a pipeline. A typical system for forming a hole in a pipeline, may be seen in FIG. 1 of U.S. Pat. No. 6,012,878 that shows a T-Fitting secured to the exterior of a pipeline with an adapter extending upwardly from the fitting. On top of the adapter is a valve and mounted onto the valve is a lower flange or collet connector that supports the tapping machine. When the tapping machine of this invention is applied to a system for providing an opening in a pipeline, the spool lower flange 92 will typically be attached to the top of a valve or to an adapter extending between the lower flange 92 and a valve. Such valve is not illustrated herein since it is a known technique and is not part of this invention.

As noted in FIG. 1, there is an annular space 94 between the interior of spool 90 and the exterior of tapping apparatus tubular housing 12. At the lower end of the tapping apparatus 10 (as shown in FIG. 1) is a circular cutter 96 attached to the lower end of boring bar 14. When the circular cutter penetrates a pipeline, the internal pressure of the pipeline is immediately applied to the annular space 94 and simultaneously to the lower end of the boring bar 14. If the differential pressure between the interior of tapping apparatus tubular housing and the interior of the pipeline is great, a significant hydraulic pressure would then be applied to the lower end of boring bar 14 which may interfere with and even prevent advancement of the boring to continue the cutting operation. Therefore, it is important that the pressure on the boring bar be relieved or counterbalanced with the internal pressure of the pipeline. For this purpose, lower flange 92 has a lateral passageway 98 therein connecting with a conduit 100 that in turn connects with the interior of a boring bar pressure compensator housing 102. Within the tubular boring bar compensator 102 is a piston 104. Extending from an opposite end of boring bar compensator housing 102 is a conduit 106 that connects with a passageway 108 in flange 18. The inward end of passageway 108 communicates with the interior of the boring bar tubular housing 12. If the pressure in the pipeline penetrated by circular cutter 96 is the same as the pressure within the interior of tubular housing 12 then there is no hydrostatic pressure load applied against the boring bar and therefore the boring can continue to be operated normally. A function of boring bar compensator 102 is therefore to equalize the pressure within the housing as communicated through the flange passageway 108 with the pressure within the pipeline as detected within annular space 94 and thereby the lateral passageway 98 in lower flange 92. Since piston 104 is free floating, it moves in response to the differential pressure on either side of it within housing 102 and therefore the pressure within the tapping apparatus tubular housing 12 is equalized.

There is, attached to conduit 100, a pressure transducer 110 that generates an electrical signal that is carried by means of conductors (not shown) to the ocean's surface to be monitored by an operator. In like manner, in communication with conduit 106, there is a pressure transducer 112 also having conductor wires (not shown) that extend to monitoring equipment at the ocean's surface.

To enable an operator to know whether the boring bar compensator housing 102 is adequately functioning, it is helpful for an operator to know the relative position of piston 104. For that purpose, there is attached to the piston a position indicator 114 that provides an electrical signal carried by conductors (not shown) to the ocean's surface.

As a safety measure, a pressure relief valve 118 is in communication with the conduit 106 and functions to relieve pressure within the conduit, thereby within the interior of boring bar compensator housing 102 and consequently within the interior of tubular housing 12 if the pressure exceeds a predetermined limit. The predetermined limit is such as would cause the damage or destruction of the compensator or the tapping apparatus tubular housing. Pressure relief valve 118 is a safety measure only and is actuated only in the event of an unusual or unexpected situation and is not normally activated during the usual application of the tapping apparatus.

Figure 3:
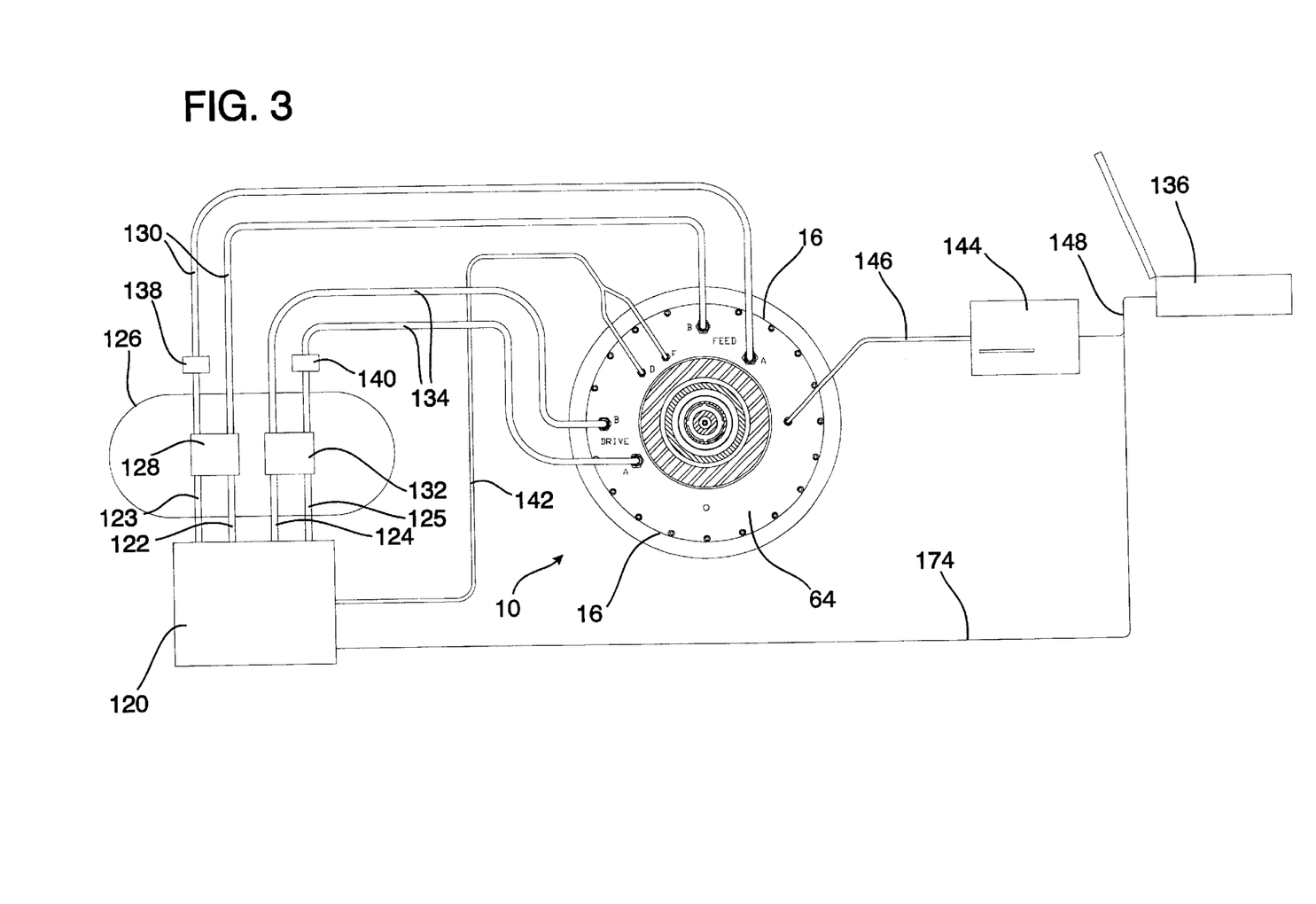
FIG. 3 is a schematic showing hydraulic and electrical lines interconnecting various operational components when the tapping machine is used in a subsea operation.

FIG. 3 illustrates hydraulic circuitry as employed with the tapping apparatus of this invention and shows a relationship of the tapping apparatus with electrical components that are used by an operator. In FIG. 3, there is shown a hydraulic power unit 120 that provides a source of hydraulic fluid flow through hydraulic line 122 with return flow through line 123 and through line 124 with return flow through line 125. The hydraulic power unit includes a reservoir from which fluid is extracted and pumped into hydraulic lines 122 and 124 and returned to the reservoir through lines 123 and 125 in the standard means that hydraulic systems commonly operate. There is a valve enclosure 126 that includes a first proportioning valve 128 having pressure hoses 130 extending therefrom that pass through openings in motor housing bottom plate 64 and connect to the feed screw drive motor 38 contained within the motor housing as shown in FIG. 4. In like manner, a second portioning valve 132 has pressure hoses 134 that pass through openings in motor housing bottom plate 64 and communicate with boring bar drive motor 40 as seen in FIG. 4. Proportioning valves 128 and 132 function to control the rotation of boring bar 14 and feed screw 26 as has been described with reference to FIG. 1. First and second proportioning valves 128 and 132 are controlled by the application of electrical signals by way of cable 174 extending from the ocean's surface. These electrical signals in turn are controlled by a computer available to an operator at the ocean's surface. The electrical conductors extending from the proportioning valves 128 and 132 to the computer extend through cable 174. Further, the hydraulic circuitry shown in FIG. 3 is diagrammatic only and not intended to represent a complete hydraulic circuit for practicing the invention.

A pressure transducer 138 is in communication with hoses 130 and in like manner a different pressure transducer 140 is in communication with hydraulic pressure hoses 134. Conductors (not shown) extend from these pressure transducers to a computer 136 located at the earth's surface and provide information to the pressures within these lines to assist the operator in the proper operation of the tapping apparatus.

FIG. 3 shows a case drain line 142 extending from openings in bottom plate 64 of the motor housing 16 whereby excess hydraulic fluid within the case is drained back into hydraulic power unit 120.

Interposed between the tapping apparatus represented by motor housing 16 in FIG. 3 and computer 136 is a subsea canister 144. A cable 146 carries electrical signals from the tapping apparatus (represented by motor housing 16) to subsea canister 144 where the signals are processed and transmitted to the ocean's surface by way of a cable 148 that is connected with computer 136. The term "computer" as used herein and as illustrated means a control facility located at the earth's surface and typically contained within a ship in which an operator works to control the tapping apparatus.

Referring again to FIG. 1, there is illustrated an important feature of the invention that needs to described. As has been previously identified, a spool 90 is employed with the tapping apparatus 10 and performs the valuable service of permitting the tapping apparatus to accommodate various lengths and/or diameter of tapping valves and collet connectors. Tapping machine 10 has, as previously described, flange 18 affixed to the external surface of the tubular housing 12. In the normal tapping apparatus this flange 18 (by which the tapping apparatus is supported to a structure that in turn is secured to the exterior of a pipeline to be penetrated) is normally at the lower end of the tubular housing 12 rather than intermediate the length of the tubular housing as illustrated in FIG. 1. By placing flange 18 intermediate the length of tubular housing 12 variable length spools 90 may be employed to adapt the tapping machine to various mounting structures. By the unique placement of flange 18 intermediate the upper end and the lower end of the tapping apparatus tubular housing 12, various valve and connector designs can be accommodated. This also allows for adapting the tapping apparatus to different pipe sizes.

Figure 9:
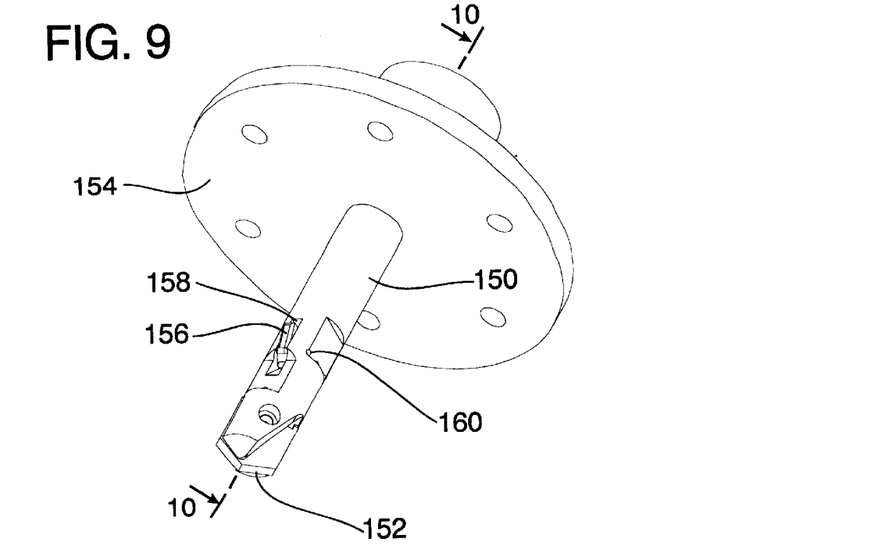
FIG. 9 is an isometric view of a pilot drill and cutter support plates as employed with the tapping machine.
Figure 10:
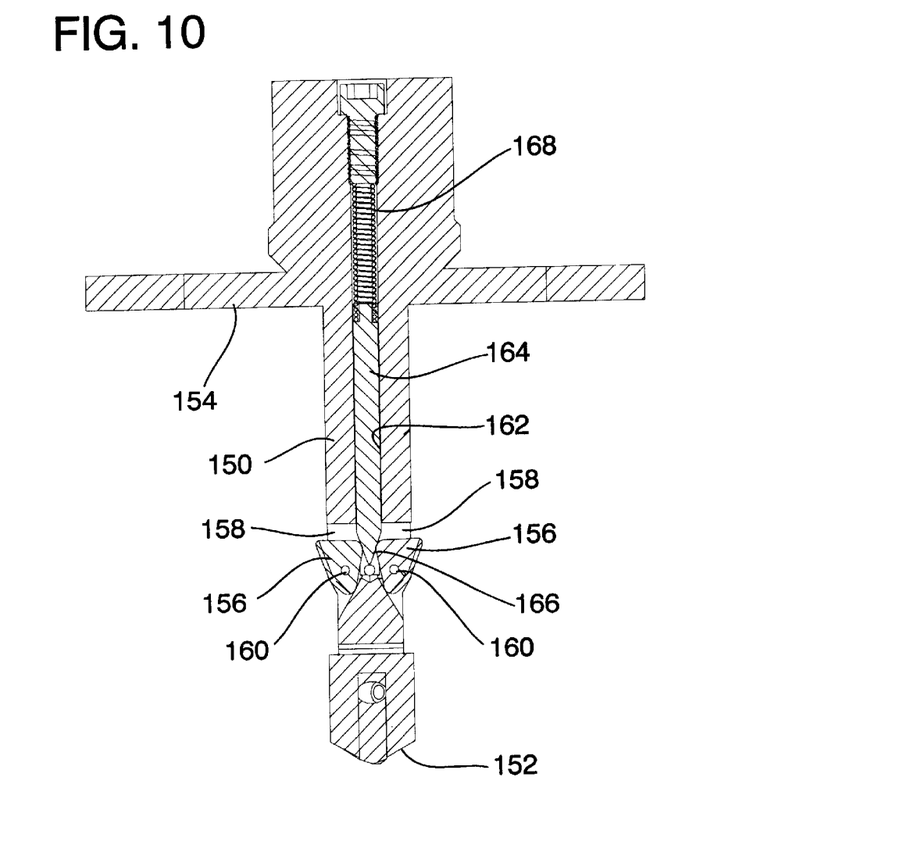
FIG. 10 is a cross-sectional view of the pilot drill and cutter support plate as taken along the line 10—10 of FIG. 9.

As seen in FIG. 1, there is shown extending axially and centrally from circular cutter 96, a pilot drill 150. Pilot drills are frequently used in connection with circular cutters 96 to first penetrate the object being cut and to thereafter form a central axis for rotatably centering the circular cutter. However, in the application of the invention herein, the pilot drill 150 serves more than to form a rotational guide for the circular cutter. Pilot drill 150 has, at the lower end thereof, a drill bit configuration typically formed like a spade bit and identified by the numeral 152 that serves to drill a pilot hole into the exterior wall of a pipeline being penetrated. The pilot drill 150 (shown best in FIGS. 9 and 10) includes an integral circumferential plate 154 to which the circular cutter (not shown in FIGS. 9 and 10 but identified by the numeral 96 in FIG. 1) is attached. It is important that the coupon formed when a hole is cut into the wall of the pipeline be captured and retained. If a coupon is formed by a circular cutter but not captured, the coupon can become lodged within the pipeline or within any piping that is laterally affixed to the pipeline that is tapped. For this purpose, it is common in the application of tapping machines to provide a mechanism for capturing the coupon and the typical means is by the use of U-wires. These U-wires (not shown) extend through lateral openings in the pilot drill 150 and pass through a pilot hole drilled in a pipeline and are arranged so that when the pilot drill is withdrawn, the U-wires engage the coupon and retain it. The U-wires are not illustrated herein since they are known prior art. Instead, an improved means of capturing a coupon is illustrated and is in the form of coupon latches 156, two of which are shown but the invention is not limited to the use of only two as it can be seen that three or perhaps four coupon latches could be employed. Coupon latches 156 are positioned in opposed slots 158 in pilot drill 150. Each coupon latch 156 is pivotally supported by a latch pin 160. When coupon latches 156 are inwardly tilted, they assume a condition so that they are of less diameter than the body of pilot drill 150 and easily pass through an opening in the coupon as formed by the spade bit 152. After the pilot drill has penetrated a pipeline and the circular cutter has advanced so that coupon latches 156 are within the interior of the pipeline, the coupon latches expand outwardly and extend in greater diameter than the opening formed by spade bit 152.

Pilot drill 150 has an elongated, axial central opening 162 therein that extends down to and communicates with slots 158. Slidably positioned within central opening 162 is a latch activation pin 164 that has a tapered end surface 166. Latch activation pin 164 is slidably received within central opening 162 and is biased downwardly by a spring 168 so that thereby the coupon latches 156 are free to retract as they pass through the thickness of the pipe coupon, but outwardly biased to expand when the pilot drill has penetrated a pipeline to positively grasp a coupon after it has been cut from the pipeline by circular cutter 96 (FIG. 1).

In the unfortunate circumstance wherein a tapping machine has been secured to the exterior of a pipeline and tapping has begun to the point that the pilot drill has penetrated into the pipeline past coupon latches 156 but (wherein such as due to failure of the circular cutter 96 or hydraulic power) the tapping cannot be completed, it is important that nevertheless in such emergency the tapping machine be removable from engagement with the pipeline. It can be seen that if it was not physically possible to withdraw the pilot drill from within a pipeline that a serious situation could arise wherein it would be impossible to remove the tapping machine. To alleviate this possibility, the latch pins 160 are configured to serve as shear pins. If drilling cannot be completed so that a free coupon is formed from the pipeline that can be easily removed by the coupon latches and a sufficient upward force is applied to detach the tapping machine, the pilot drill can be removed because pins 160 will shear. Thus the use of shear pins 160 as the pins to pivotally support the coupon latches serves as a safety feature. The shape of the latches 156 and the slots 158 are such to ensure that the latches will exit the slots.

Figure 2A:
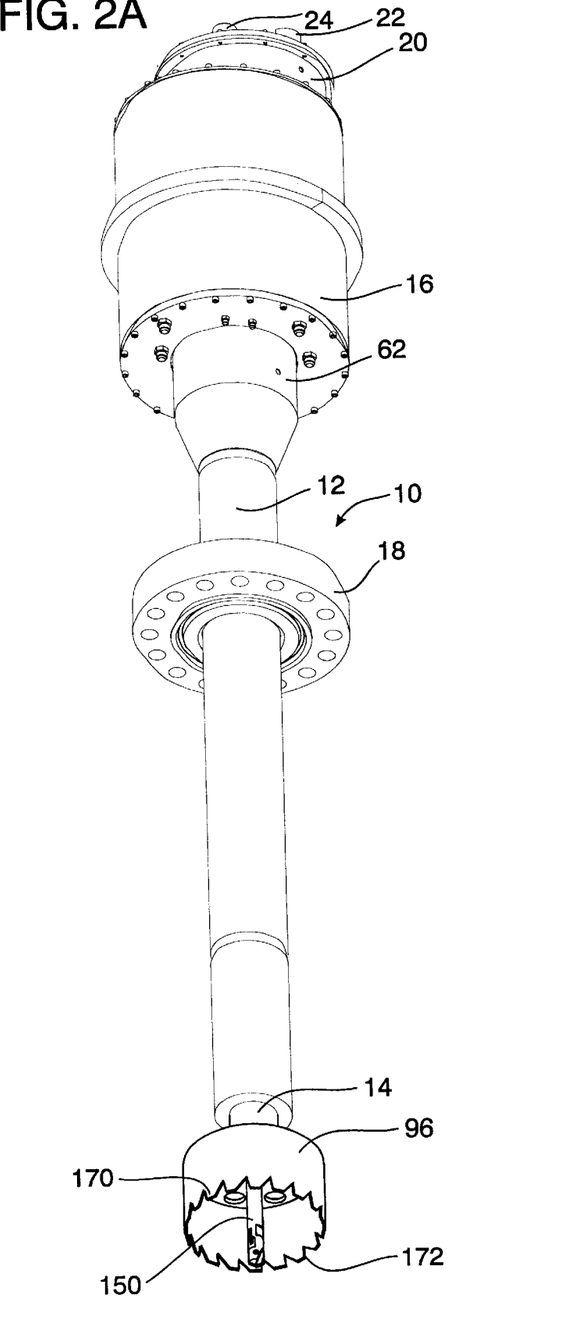
FIG. 2A is an isometric external view of the tapping machine shown in FIG. 2.

Reference has previously been made to the importance of guarding against failure of the tapping machine particularly since it is useful in remote locations such that an operator cannot be physically present at the tapping machine. It can be foreseen that the most difficult aspect of forming a tap into the wall of the pipeline is that of boring a coupon into the pipeline wall. Most pipelines used underwater, and particularly used at deep ocean depths are formed of steel that is formulated to provide great strength and pressure containing capacity. Therefore, high pressure pipelines require relatively thick walls and are also formed of high quality steel, meaning that the steel is not of the kind that is easily cut with a circular cutter. In most surface applications, a circular cutter as used with a boring machine is the type that has teeth that are individually welded or braised to the circular cutter body. In the same manner, high quality circular cutter blades used for metal and wood cutting typically have teeth that are of a metal different than the cutter body itself. Welded on teeth have advantages in that the material of which the teeth are made can be much harder and wear resistant than the metal of which the circular cutter body itself is formed since the circular cutter body must withstand stresses and strains that impose different requirements than that of the cutting tip itself However, the use of welded-on teeth is a source of potential problems since if one or more teeth become dislodged from a circular cutter, it can interfere with the operation of the cutter and can result in the failure of the cutter to be able to penetrate a pipe. To avoid failure of one or more welded-on teeth on a circular cutter, a preferred practice of this invention is to utilize a circular cutter that does not have welded-on teeth but instead has teeth integrally formed with the circular cutter body. FIGS. 2A and 2B illustrate a circular cutter 96 that has hard-facing applied to the cutter body to form the forward edge of each tooth in which the teeth are integrally formed with the circular cutter itself—that is, in which machine tool inserts are not employed in the manufacture of the circular cutter. Circular cutter 96 with pilot drill 150 (as previously described) has integral teeth 170 that have been built up by weld deposition of hardface material 172 to the forward cutting edge of each tooth. Hardface material 172 is applied by welding to the forward edge of each tooth 170 so that the hardface material becomes integrally formed with circular cutter 96, after which the hardface material is ground to provide the sharp cutting edges 170 required for cutter 96 to cut through the wall of a pipeline. This procedure provides the advantages of a cutter having welded-on teeth and reduces the possibility of failure that can occur if a brazed on or mechanically attached tooth is dislodged.

To insure independent control of feed screw drive motor 38 and boring bar drive motor 40, and thereby control of the speeds of boring bar 14 and feed screw 26 while using a single hydraulic power source, a hydraulic counterbalance valve 174 (see FIGS. 1 and 4) is placed in hydraulic tubing 66A. Overrunning is the tendency of feed screw drive motor 38 to rotate because of the rotation of boring bar drive motor 40. Frictional forces generated by seals subjected to high pressures tend to rotate feed screw drive motor 38 when boring bar drive motor 40 is turning. Counterbalance valve 174 is normally open but is closed when pressure on the downstream side of feed screw drive motor 38 as sensed in tubing 66B is high compared with the upstream pressure in tubing 66A on the feed screw drive motor in which case counterbalance valve 174 is actuated, to thereby control the tendency of the feed screw drive motor to overrun.

The advantages of the various features of the tapping machine of this invention are summarized in the following paragraphs a) through i).

a) To maximize user control, the tapping machine has independent feed and drive controls. Drive is the rotational speed of the cutter, usually measured in revolutions per minute (RPM). Feed is the cutter's rate of advance toward the pipe, usually measured in thousandths of an inch per revolution of the cutter. To obtain independent control, separate hydraulic motors are used in the tapping machine. The boring bar drive motor 40 rotates the boring bar. Feed screw drive motor 38 rotates the feed screw which is threaded and turns in a feed nut that is press-fitted to boring bar 14. Cutter 96 and pilot drill 150 are attached to boring bar 14 using a cutter plate 154. Hydraulic motors 38 and 40 are controlled by hydraulic directional proportional valves 128 and 132 respectively. To prevent overrunning of the feed motor by the drive motor a counterbalance valve 174 is employed.

b) To measure the drive and feed RPM the diverless tapping machine is equipped with rotational speed sensors 44 and 48. Rotating magnet wheels 42 and 46 are mounted behind feed and drive motors 38 and 40. The Hall Effect sensors 44 and 48 detect passage of the teeth on wheels 42 and 46 to provide rotational speed data of the motors. By making use of the known relationship between the speed of rotation of the feed and drive motors and the feed screw pitch, the feed rate of the advance or retraction of the boring bar relative to the pipe can be calculated. Right hand rotation of drive motor 40 advances boring bar 14 toward a pipeline while right hand rotation of feed motor 38 retracts boring bar 14 away from pipeline. Using this relationship, the feed rate is calculated after subtracting the feed motor RPM from the drive motor RPM. An anti-stall feature is also provided. If the cutter starts to stall, the feed motor RPM will exceed the drive motor RPM and the cutter will be retracted away from the pipeline to clear the cutter.

c) In addition to rotational speed sensors 44 and 48 which provide information from which the position of boring bar 14 can be derived, a more direct indication of the position of the boring bar is provided available with linear position transducer 50. The tapping machine configuration permits use of this elongated transducer. Linear positioning transducer 50 uses magnetostrictive technology. Linear positioning instrumentation of the type using a position transducer 50 and magnet 54 is commercially available from MTS Systems Corporation having an office in Cary, N.C., USA. This system provides a highly repeatable result with no moving parts so that no wear occurs.

d) Hydraulic motors 38 and 40 are enclosed in oil filled motor housing 16 to prevent ingress of seawater. Hydraulic fluid within motor housing 16 is equalized to the pressure of subsea water. Check and relief valves 82 and 84 are used to assure that no significant pressure differential can occur even if the compensation system fails. The boring bar pressure is first equalized to the subsea pressure and after the pilot drill has penetrated the pipe, the boring bar pressure is equalized with the pipeline pressure by means of piston 104 acting within compensator housing 102. This equalization system significantly reduces the forces necessary to rotate boring bar 14 while tapping. A relief valve 118 is used to ensure that the boring bar can be retracted after a tap in the event the equalization system fails. Boring bar pressure equalization is achieved using boring bar compensator 102.

e) The control panel, as represented by computer 136, controls tapping machine 10 and includes electronic controls for operating both hydraulic motors 38 and 40 as well as displaying their RPM readouts. The linear position transducer 50 as well as the position of piston 104 in compensation housing 102 is also monitored. Pressure transducers 138 and 140 monitor the feed and drive motor input. The boring bar accumulator and motor housing pressures are monitored by transducers 80 and 112.

f) A diverless tapping machine for practicing the invention as disclosed herein typically weighs approximately seven thousand pounds when completely assembled and filled with hydraulic oil. The typical overall length of a tapping machine is just over fifteen feet when fitted with a cutter 96 and pilot drill 150. The overall stroke of boring bar 14 is about seven feet. A typical tapping machine for subsea uses is designed to make six to twenty-four inch taps into a variety of pipe diameters. The tapping machine is equipped with an adapter flange 18 about midway on tubular housing 12.

g) To stay on center when making a tap, pilot drill 150 is used to pierce a pipeline and then cutter 96 is guided by the drill. Pilot drill 150 has increased reliability for coupon retention. In addition to the field-proven U-wire design used on most tapping machines (not shown in the drawings), pilot drill 150 is equipped with positive-retention latches 156.

h) Cutter 96 uses teeth 170 to which hard-facing 172 has been applied. Hard-facing is applied to the body of cutter 96 and then the teeth are "precision ground hard-facing" which minimizes wear and eliminates the possibility of losing a tooth and virtually eliminates the possibility of having to replace cutter 96 during a tap.

i) An important safety feature of the tapping machine illustrated and described herein is a mechanical override adapted for use by a remotely operated vehicle (not shown). If, for some reason, hydraulic power to the tapping machine is lost during a subsea operation, boring bar 14 and cutter 96 can be retracted by mechanically rotating feed screw auxiliary drive shaft 34. Motive force to rotate the feed screw auxiliary drive shaft can be supplied by a remotely operated vehicle commanded to attach to connector 24 and engage feed screw auxiliary drive shaft 34. After boring bar retraction, the tapping valve can be closed. After power is restored, a tapping operation can be continued or the tapping machine can be retrieved if additional repairs are needed.

An important aspect of the apparatus for tapping hole in a pipeline as described herein is provision for operating the apparatus in subsea environments and especially in subsea locations that are too deep for the use of human divers. Further, the apparatus is specifically adapted for tapping a pipeline that is under pressure that may substantially exceed or be exceeded by the ambient pressure of the subsea environment. Therefore, balancing of pressures within the apparatus becomes very important. The pressure balancing systems disclosed herein can be accomplished using elastomeric bladders, piston accumulators and pressure compensators, as examples, and it is understood that these various terms are used herein to mean any kind of device that separates seawater from hydraulic fluid or lubricant while permitting equalization of pressure between the seawater and the fluid or lubricant.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. Apparatus for tapping an opening in a pipeline adapted to be attached to a support assembly having sealed communication with the exterior of the pipeline, the apparatus comprising;

an elongated tubular spool member having a lower end adapted for sealed communication with said support assembly and having an adapter flange on an upper end thereof;

a tapping machine elongated tubular body having a lower end out through which a boring bar extends, the boring bar having a cutter on the lower end thereof;

a boring bar drive assembly supported to an upper end of said tapping machine tubular body for rotating and axially positioning said boring bar; and a mounting flange affixed exteriorly of said tapping machine tubular body intermediate of said tubular body upper and lower ends, the mounting flange being removably connectable to said spool member adapter flange, a significant portion of said elongated tubular body extending within said spool member.

2. Apparatus for tapping an opening in a pipeline according to claim 1 wherein said spool member has, at said lower end thereof, an increased external diameter flange portion having a radial opening therein providing communication between interior and exterior surfaces of said spool member.

3. Apparatus for tapping an opening in a pipeline according to claim 2 wherein said mounting flange has a radial opening therein communicating between an interior area of said tapping machine elongated tubular body and an exterior surface of said mounting flange, said first mentioned and second mentioned radial openings providing means of equalizing pressure internally of said spool with pressure internally of said tapping machine tubular body.

4. Apparatus for tapping a hole in a pipeline for use with a support assembly having sealed communication with the exterior of the pipeline, the apparatus comprising;
   a tubular tapping machine body adapted for attachment to said support assembly;
   a boring bar rotatably supported within said tapping machine body tubular portion and adapted at the lower end thereof to support a cutter;
   a feed screw rotatably supported within said tapping machine body by which the axial position of said boring bar is controlled;
   a first magnet wheel affixed to and rotated by said feed screw;
   a second magnet wheel affixed to and rotated by said boring bar;
   a first sensor in proximity to said first magnet wheel and providing a first electrical signal responsive to the rotation of said feed screw;
   a second sensor in proximity to said second magnet wheel and providing a second electrical signal responsive to the rotation of said boring bar, said first and second electrical signals providing means of determining the relative rotation of said feed screw and said boring bar by which said axial position of said boring bar is determined and indicated.

5. An apparatus for tapping a hole in a pipeline according to claim 4 wherein said transducer assembly comprises an elongated sensing rod and a magnet.

6. An apparatus for tapping a hole in a pipeline according to claim 5 wherein said boring bar is tubular and wherein said sensing rod is an elongated linear positioning transducer rod supported at one end portion to said tapping machine body and extending telescopically within said boring bar and wherein said magnet is affixed to and linearly positioned relative to said transducer rod by said boring bar.

7. An apparatus for tapping a hole in a pipeline according to claim 4 wherein said tapping machine body supports a rotatable feed screw forming a part of said boring bar drive assembly by which the axial position of said boring bar is controlled and including;
   a first rotation sensor associated with said boring bar;
   a second rotation sensor associated with said feed screw; and
   circuitry connected to said first and second rotation sensors by which the axial position, the speed of rotation and the feed rate of said boring bar are indicated.

8. Apparatus for tapping a hole in a pipeline for use with a support assembly having sealed communication with the exterior of the pipeline, the apparatus comprising;
   an elongated tubular tapping machine body adapted for attachment to said support assembly;
   an elongated externally threaded boring bar rotatably supported within said tapping machine body and adapted at the lower end thereof to support a cutter;
   an elongated, tubular, internally threaded feed screw rotatably supported and axially fixed within said tapping machine body, said boring bar being threadably received within said feed screw whereby the relative rotation of said boring bar and said feed screw determine the axial position of said boring bar;
   a first magnet wheel rotated by said boring bar;
   a first sensor in proximity to said first magnet wheel providing a first electrical signal;
   a second magnet wheel rotated by said feed screw;
   a second sensor in proximity to said second magnet wheel and providing a second electrical signal;
   circuit means for comparing said first and second electrical signals by which the axial position, the speed of rotation and the rate of feed of said boring bar are indicated.

9. Apparatus for tapping a hole in a pipeline according to claim 8 wherein at least one of said first and second sensors is a Hall Effect sensor.

10. Apparatus for tapping a hole in a pipeline according to claim 8 wherein said boring bar is tubular and including;
    an elongated linear position transducer rod supported at one end portion to said tapping machine body and extending telescopically within said boring bar;
    a magnet affixed to and linearly positioned relative to said transducer rod by said boring bar; and
    a circuit including said transducer rod providing a third electrical signal indicative of the axial position of said boring bar relative to said tapping machine body said third electrical signal providing a redundant indication of the axial position of said boring bar.

11. Apparatus for tapping a hole in a pipeline, for use with a support assembly having sealed communication with the exterior of the pipeline apparatus comprising:
    a tapping machine formed of a pressure resisting body housing and extending therefrom a tubular body portion adapted for attachment at a lower end thereof to said support assembly;
    a boring bar rotatably supported within said tubular body portion and having a cutter at the lower end thereof;
    a feed screw rotatably supported by said tubular body portion for axially positioning said boring bar;
    a boring bar drive assembly within said pressure resisting housing for driving said boring bar;
    a feed screw drive assembly within said pressure resisting housing for driving said feed screw;
    a first motor positioned within said pressure resisting housing and connected to said boring bar drive assembly for rotation of said boring bar;
    a second motor positioned within said pressure resisting housing and connected to said feed screw drive assembly for rotation of said feed screw; and
    an auxiliary drive shaft affixed to said feed screw drive assembly and extending sealably exteriorly of said pressure resisting housing and adapted to receive supplementary rotary energy for rotation of said feed screw.

12. Apparatus for tapping a hole in a pipeline according to claim 11 wherein said boring bar and feed screw drive assemblies are actuated by separate hydraulic motors.

13. An apparatus for tapping a hole in a pipeline for use with a support assembly having sealed communication with the exterior of the pipeline, the apparatus comprising;
    a tapping machine body having a tubular portion adapted for attachment to said support assembly;

an externally threaded rotatably supported feed screw that is axially fixed with respect to said tapping machine body;

a first hydraulic motor supported by said tapping machine body rotatably driving said feed screw;

an internally threaded boring bar rotatably supported in threaded relationship with said feed screw and axially displaceable with respect to said tapping machine body;

a second hydraulic motor supported by said tapping machine body rotatably driving said boring bar;

a cutter affixed to a lower end of said boring bar adapted to cut a hole in a pipeline;

a first rotation sensor associated with said boring bar;

a second rotation sensor associated with said feed screw;

circuitry connected to said first and second rotation sensors by which the relative rotation of said feed screw and boring bar can be determined and thereby the axial position of said boring bar relative to said tapping machine body; and a proportioning valve system controlling hydraulic fluid flow to said first and second hydraulic motors.

14. An improved rotational cutter for cutting a hole in a pipeline wall having provision for retaining a coupon formed when a hole is cut, comprising;

a saw body having an upper end portion adapted to be rotationally supported;

a tubular saw having a rearward end portion secured to said saw body and a forward end portion having teeth thereon for cutting into a pipeline and forming a coupon cut from the pipeline;

a pilot drill in axial alignment with and extending from said saw body and having a drill tip that first penetrates a pipeline wall before said teeth of said tubular saw engage the pipeline wall;

at least one latch member pivotally secured to said pilot drill in a groove in said pilot drill formed at a position displaced from said drill tip and configured such that the latch when pivoted inwardly freely passes through a hole formed by said drill tip and when pivoted outwardly presents a diametrical measurement greater than said drill tip;

a pivot pin securing said latch member to said pilot drill;

a bias member that resiliently biases said latch member outwardly whereby said at least one latch member retaining said coupon cut from the pipeline, and wherein said groove and latch member are configured to permit said latch member to displace to permit said pilot drill to be extracted from the pipeline if a coupon is not completed and if upward force is applied to said pilot drill to shear said pivot pin.

15. An apparatus for tapping a hole in a submerged pressurized pipeline and therefore subject to ambient hydrostatic pressure comprising;

an elongated tubular tapping machine body having a boring bar that receives a cutter at its lower end, the boring bar being axially displaceable to move said cutter into and out of engagement with a pipeline;

a fluid passageway in a lower end portion of said tapping machine body by which the internal pressure of a pipeline is sensed after the pipeline is penetrated by said cutter;

a pressure equalizer having a first communication with said fluid passageway and a second communication with the interior of said tapping machine body to balance hydraulic forces applied to said boring bar during a tapping operation; and a relief valve in communication with said pressure equalizer to relieve pressure in the event of failure of said pressure equalizer to prevent excessive pressure interference with retraction of said boring bar.

16. An apparatus for tapping hole in a pipeline submerged in seawater and therefore subject to ambient hydrostatic pressure comprising;

an elongated tubular tapping machine body having a boring bar that receives a cutter at its lower end, the boring bar being axially displaceable to move said cutter into and out of engagement with the pipeline;

a motor housing affixed to said tapping machine body that contains a motor adapted to actuate said boring bar;

a fluid isolating equalizer supported in relationship to said tapping machine body and having a first communication with the interior of said motor housing and a second communication with said ambient hydrostatic pressure; and a relief valve system to allow seawater into said motor housing to prevent the collapse thereof and to permit escape of fluid from within said motor housing to prevent rupture thereof in the event of failure of said fluid isolating equalizer.

17. Apparatus for tapping a hole in a pipeline, comprising;

a tapping machine body having a tubular portion for attachment to an assembly adapted for sealed communication with an exterior surface of the pipeline;

a boring bar rotatably supported within said tapping machine body tubular portion and having a cutter at the lower end thereof;

a feed screw rotatably supported by said tapping machine body for axially positioned said boring bar;

a controllable boring bar drive assembly within said tapping machine body for rotating said boring bar;

a controllable feed screw drive assembly within said tapping machine body for rotating said feed screw;

a boring bar position, rotation speed and feed rate monitor; and a remote control system receiving input from said boring bar position monitor and providing signals for controlling said controllable boring bar drive assembly and said feed screw drive assembly whereby the rotation and position of said boring bar is remotely controlled for engaging said cutter with the exterior surface of the pipeline, cutting a hole in the pipeline and retracting said cutter from engagement with the pipeline.

18. An apparatus for tapping a hole in a submerged pressurized pipeline adapted to be attached to a support assembly having sealed communication with the exterior of the pipeline, the apparatus comprising;

a tubular spool having a lower end adapted for attachment to the support assembly;

a tapping machine body having a tubular portion having a rotatable boring bar that receives a cutter on its lower end, the boring bar being axially displaceable to move said cutter into and out of engagement with the pipeline, the lower end of which is telescopically received in said tubular spool and an upper end of said tubular spool being secured to said tapping machine body providing an annular area between an interior surface of said spool and an exterior surface of said tapping machine body that is subject to ambient hydrostatic pressure before the apparatus is attached to the support structure and is subject to pressure within the pipeline after the pipeline has been penetrated by said cutter; and a pressure equalizer having a first communication with said fluid passageway and a second communication with the interior of said tapping machine body to balance hydraulic forces applied to said boring bar during a tapping operation.

19. Apparatus for tapping a hole in a pipeline for use with a support assembly having sealed communication with the exterior of the pipeline, the apparatus comprising;

a tapping machine body adapted for attachment to the support assembly;

an elongated externally threaded boring bar rotatably supported within said tapping machine body and adapted at the lower end thereof to support a cutter;

an elongated tubular, internally threaded feed screw rotatably supported and axially fixed within said tapping machine body, said boring bar being threadably received within said feed screw whereby the relative rotation of said boring bar and feed screw determine the axial position of the boring bar;

a boring bar hydraulic motor connected for rotation of said boring bar;

a feed screw hydraulic motor connected for rotation of said feed screw and having first and second conduits conducting hydraulic fluid to and from said second hydraulic motor;

a counterbalance valve in series with said first conduit, the counter balance valve being responsive to fluid pressure in said second conduit whereby hydraulic fluid pressure to said second hydraulic motor is controlled to prevent overrunning of said feed screw.

* * * * *